(12) United States Patent
Mori et al.

(10) Patent No.: US 6,559,590 B1
(45) Date of Patent: May 6, 2003

(54) PAINT FOR HEAT ABSORBING FILM, HEAT ABSORBING FILM AND COLOR CRT

(75) Inventors: Masatoshi Mori, Aichi (JP); Akihiko Yoshida, Aichi (JP); Kimiyo Ibaraki, Aichi (JP); Hitoshi Kimata, Chiba (JP); Yasunori Metsugi, Chiba (JP); Shunichi Abe, Chiba (JP); Atsumi Wakabayashi, Chiba (JP)

(73) Assignees: Sony Corporation (JP); Sumitomo Osaka Cement Co., Ltd. (JP)

( * ) Notice: Subject to any disclaimer, the term of this patent is extended or adjusted under 35 U.S.C. 154(b) by 0 days.

(21) Appl. No.: 09/564,706

(22) Filed: May 4, 2000

(30) Foreign Application Priority Data

May 10, 1999 (JP) .......................................... 11-127933

(51) Int. Cl.[7] .......................... H01J 29/28; H01J 29/89
(52) U.S. Cl. ....................................... 313/466; 313/479
(58) Field of Search ................................. 313/466, 479, 313/461; 428/327, 421

(56) References Cited

U.S. PATENT DOCUMENTS 6,129,980 A * 10/2000 Tsukada et al. ............. 313/479

FOREIGN PATENT DOCUMENTS

| JP | 51-52782 | 5/1976 |
| JP | 62-47341 | 10/1987 |

* cited by examiner

Primary Examiner—Vip Patel
Assistant Examiner—Joseph Williams
(74) Attorney, Agent, or Firm—Rader, Fishman & Grauer PLLC; Ronald P. Kananen

(57) ABSTRACT

A paint for forming a heat absorbing film which exhibits a good binding property for binding with a conductive reflecting film, contains a black pigment, and a compound represented by $Si(OR^1)_n R^2_m$, where $n+m=4$, $n=1$ to 4, $m=0$ to 3, each of $R^1$ and $R^2$ is one of an alkyl group, an alkenyl group and an aryl group, or a hydrolyzate of the compound. Also, the present invention relates to a heat absorbing film formed out of this heat absorbing film paint and a color CRT provided with this heat absorbing film.

25 Claims, 1 Drawing Sheet

PAINT FOR HEAT ABSORBING FILM, HEAT ABSORBING FILM AND COLOR CRT

BACKGROUND OF THE INVENTION

1. Field of the Invention

The present invention relates to a paint for a heat absorbing film provided on a conductive reflecting film formed on a fluorescent surface on the inner surface of a panel of a color cathode ray-tube (CRT), a heat absorbing film obtained from the paint and a color CRT provided with the heat absorbing film.

2. Description of the Related Art

A color CRT of panel structure shown in, for example, FIG. 2 has been hitherto known.

In FIG. 2, a reference symbol 21 denotes a transparent panel of a color CRT. A fluorescent surface 22, consisting of red, green and blue fluorescent stripes and carbon stripes embedded therebetween, is formed on the inner surface of this transparent panel 21. The fluorescent surface 22 is designed such that an electron beam emitted from an electron gun is selectively landed through a color selection electrode (not shown) on the respective colors of fluorescent stripes and scanned horizontally and vertically, to thereby display a color image. As the color selection electrode, an aperture grill having many slits formed at predetermined intervals or a shadow mask having many transparent holes formed in a predetermined arrangement is used.

In addition, to smooth an irregular surface formed by the fluorescent stripes, an organic intermediate film (not shown) is formed on the fluorescent surface 22. A conductive reflecting film 23 made of aluminum referred to as a metal back is formed on the organic intermediate film in a state in which the film 23 covers the fluorescent surface 22 as well as the outer periphery of the surface 22. The conductive reflecting film 23 is formed by aluminum having high light reflectance and high electron transmittance. Due to this, the film 23 functions to reflect light emitted toward the electron gun (not shown) to the transparent panel 21 side to increase display brightness and to stabilize the potential of the fluorescent surface 22 when the fluorescent surface 22 emits light.

Meanwhile, when the color selection electrode consisting of the aperture grill or the shadow mask is applied with an electron beam, the temperature of the electrode increases and the electrode is thermally expanded.

Further, aluminum which is a material for the conductive reflecting film 23 has also high heat reflectance. Due to this, when the film 23 is exposed, radiation heat from the color selection electrode which has been heated as a result of collision against the electron beam is reflected by the conductive reflecting film 23 and radiated again on the color selection electrode, with the result that the color selection electrode is further heated and further thermally expanded.

As can be seen, when the color selection electrode is heated and thermally expanded, the positions of the slits of the aperture grill or those of the transparent holes of the shadow mask are shifted and the correspondence between the color selection electrode including these slits or holes and the fluorescent stripes on the fluorescent surface 22 varies. As a result, the electron beam is erroneously landed on the fluorescent surface 22 and color slippage and the degradation of brightness and color purity disadvantageously occur.

To avoid these disadvantages, the following technique is conventionally, though partly, adopted. A heat absorbing film 24 is formed on the conductive reflecting film 23 to allow the heat absorbing film 24 to absorb heat radiated from the color selection electrode, the reflection and radiation of the heat from the conductive reflecting film 23 to the color selection electrode is suppressed to thereby prevent the thermal expansion of the color selection electrode.

As an example of such a heat absorbing film 24, there is proposed a color CRT described in the Japanese Patent Examined Application Publication No. 62-47341. In the color CRT, aluminum is deposited in a vacuum of about 0.2 to 0.3 Torr and a heat absorbing film 24 formed out of a black aluminum film is thereby formed.

Further, in a cathode ray-tube described in the Japanese Patent Unexamined Application Publication No. 51-52782, a solution obtained by dissolving carbon in a solvent essentially consisting of an alcohol group is sprayed and a carbon film which becomes a heat absorbing film 24 is formed on the conductive reflecting film 23.

In the case of the above-stated color CRT, however, the heat absorbing film 24 is formed by means of a deposition method in a vacuum of as low as 0.2 to 0.3 Torr. Due to this, the interior of a deposition unit is easily contaminated, a desired vacuum is difficult to attain and the film thickness of the heat absorbing film 24 becomes irregular and the heat absorbing effect thereof become unstable.

For these reasons, the reflection and radiation of the heat from the conductive reflecting film 23 to the color selection electrode cannot be efficiently suppressed, thus making it difficult to ensure preventing the electron beam from erroneously landing onto the fluorescent surface 22 and to manufacture a color CRT with sufficiently reduced color slippage. Furthermore, the irregular thickness of the heat absorbing film 24 causes irregularity in color purity resulting from scattered electrons.

Moreover, in the case of the above-stated CRT, the binding property for binding the carbon film serving as the heat absorbing film 24 and the conductive reflecting film is weak and the carbon film easily comes off due to external vibration. Thus, it is difficult to ensure high reliability against color slippage.

Besides, if the heat absorbing film 24 normally differs greatly in the coefficient of thermal expansion from the conductive reflecting film 23 made of aluminum and positioned under the heat absorbing film 24 and blocks the evaporation holes of the organic intermediate film formed on the conductive reflecting film 23, then the film may disadvantageously crack in the heat treatment process or float from the conductive reflecting film 23.

SUMMARY OF THE INVENTION

The present invention has been made in view of the above-stated circumstances. It is, therefore, an object of the present invention to provide a paint for forming a heat absorbing film which exhibits a good binding property for binding with a conductive reflecting film, suppresses color slippage and irregularity in color purity and is prevented from cracking and floating from a to-be-coated surface, a heat absorbing film obtained form the paint and a color CRT provided with the heat absorbing film.

To obtain the above object, a paint for a heat absorbing film provided on a conductive reflecting film formed on a fluorescent surface on an inner surface of a panel of a color CRT as claimed in claim 1 of the present invention, comprises:

a black pigment having a grain diameter of not less than 10 nm and not more than 2000 nm; and a compound represented by Si(OR1)nR2m, where n+m=4, n=1 to 4, m=0 to 3, each of R1 and R2 is one of an alkyl group, an alkenyl group and an aryl group, or a hydrolyzate of the compound.

Further, to obtain the object, a heat absorbing film for a heat absorbing film provided on a conductive reflecting film formed on a fluorescent surface on an inner surface of a panel of a color CRT as claimed in claim 5, comprises:

a black pigment; and a compound represented by Si(OR1)nR2m, where n+m=4, n=1 to 4, m=0 to 3, each of R1 and R2 is one of an alkyl group, an alkenyl group and an aryl group, the carbon number of R2 falling within a range of 1 to 10, or a hydrolyzate of the compound.

Moreover, to obtain the object, a heat absorbing film as claimed in claim 8 of the present invention is formed by being coated with the paint for a heat absorbing film as claimed in claim 1 stated above.

To obtain the object, a heat absorbing film as claimed in the thirteenth aspect is formed by being coated with the paint for a heat absorbing film as claimed in the fifth aspect stated above.

Additionally, to obtain the object, a heat absorbing film as claimed in the seventeenth aspect of the present invention includes the heat absorbing film as claimed in the eighth aspect stated above.

Furthermore, to obtain the object, a heat absorbing film as claimed in claim 22 includes the heat absorbing film as claimed in claim 13 stated above.

According to the above-stated paint for a heat absorbing film, if this paint is applied onto the conductive reflecting film and dried, then the compound represented by Si(OR1)nR2m or the hydrolyzate thereof becomes $SiO_2$ and functions as a binder. As a result, the black pigment is strongly bound with the conductive reflecting film.

Here, a manufacturing process for the color CRT includes a heat treatment step at a temperature of not less than 350° C. and not more than 500° C. For that reason, it is required that the heat absorbing film obtained from this heat absorbing film paint has no color change before and after the heat treatment step.

Accordingly, as the black pigment, one which is not discolored at 500° C. and has excellent electron beam transmittance is used. Graphite fine grains are particularly preferable due to their excellent heat resistance, high black chromaticity and high electron transmittance. In addition, a material containing at least one of, for example, C, Mn, Fe, Ni, Zn, Cr, Cu and Co, i.e., a single substance made of each element and an oxide (e.g., Co—Fe—Cr composite oxide), an organic substance is used.

The grain diameter of such a black pigment is not less than 10 nm and not more than 2000 nm, preferably not more than 100 nm. If less than 10 nm, the dispersibility of the grains into the paint considerably deteriorates to make it difficult to obtain a uniformly paint dispersed solution. If it exceeds 2000 nm, the hiding power of the grains themselves weakens and sufficient tinting strength, i.e., sufficient heat absorbing effect cannot be obtained. Besides, if it is not more than 100 nm, the heat absorbing film to be obtained can be easily made uniform.

The paint for the heat absorbing film according to the present invention can contain not only the black pigment but also another colored pigment to the extent that the effect of the black pigment is not hampered. By using both the black pigment and the other colored pigment, it is possible to further improve the heat absorbing property of the film. The colored pigment should not be limited to any specific one and various types of pigments may be used.

Furthermore, the manganese compound and chromium compound or, to be specific, metal compounds such as manganese nitrate, manganese chloride, chromium nitride and chromium chloride are suitably used since they are thermally decomposed and colored in the heat treatment step during the manufacture of the color CRT. These metal compounds may be used solely or a combination of two or more types thereof may be used.

As for a dispersion medium for dispersing the black pigment and, if any, the colored pigment, about 0.1 to 100 weight parts of at least one out of anionic, cationic and non-ionic surfactants, epoxy resins, phenol resins, urethane resins, melamine resins, butyral resins, vinyl acetate resins, ionomer resins, isobutylen-maleic anhydride copolymer resins, polyvinyl alcohol and polyvinylpyrrolidone are used with respect to 100 weight parts of the black pigment. A black pigment and/or colored pigment dispersed solution is obtained by conducting a well-known dispersion method such as a homogenizer, a sand mill, a ball mill and ultrasonic wave using the dispersion medium(s).

As for the compound which serves as a binder for the paint according to the present invention and represented by Si(OR1)nR2m (where n+m=4, n=1 to 4, m=0 to 3 and R1 and R2 are alkyl groups, alkenyl groups or aryl groups), it is preferable that the number of carbons of the R2 group falls within the range of 1 to 10. To be specific, the R2 group preferably consists of one of a methyl group, a phenyl group, a vinyl group, a γ-methacryloxypropyl group and γ-glycidoxypropyl group.

Specifically, the compounds represented by the general formula of Si(OR1)nR2m may involve tetramethoxysilane, tetraethoxysilane, methyltrimethoxysilane, methyltriethoxysilane, phenyltrimethoxysilane, phenyltriethoxysilane, vinyltrimethoxysilane, vinyltriethoxysilane, γ-methacryloxypropyltrimethoxysilane, β-(3,4 epoxycyclohexyl)ethyltrimethoxysilane, γ-glycidoxypropyltrimethoxysilane, N-β(aminoethyl )γ-aminopropyltrimethoxysilane, γ-aminopropyltriethoxysilane, N-phenyl-γ-aminopropyltrimethoxysilane, γ-mercaptopropyltrimethoxysilane.

These compounds represented by Si(OR1)nR2m can be used solely or a combination of two or more types thereof can be used.

In the general formula Si(OR1)nR2m, it is preferable to use trifunctional silicate where n=3, m=1 and the number of carbons of R2 is 1 to 10. To be specific, it is preferable to use, for example, methyltrimethoxysilane, methyltriethoxysilane, phenyltrimethoxysilane, phenyltriethoxysilane, vinyltrimethoxysilane, vinyltriethoxysilane, γ-methacryloxypropyltrimethoxysilane, γ-glycidoxypropyltrimethoxysilane and the like.

To hydrolyze and condensation-polymerize Si(OR1)nR2m, mineral acid such as hydrochloric acid, nitric acid, phosphoric acid and boric acid, organic acid such as formic acid, maleic acid, fumaric acid, propionic acid, oxalic acid, malonic acid, tartaric acid and succinic acid, or alkali such as ammonia, trimethylammonium is used as a catalyst and nitric acid is particularly suitable.

Further, the quantity of water used to hydrolyze and condensation-polymerize Si(OR1)nR2m is preferably within a range of 0.1 to 100 moles with respect to 1 mole of Si(OR1)nR2m.

Moreover, as a solvent for dispersing or dissolving a dispersed solution in which hydrolytic polycondensate of Si(OR1)nR2m and the black pigment are dispersed, alcohols, glycol derivatives, esters, ketones, ethers or the like may be used. They may be used solely or a combination of two or more types thereof may be used.

Here, as the alcohol, methanol, ethanol, n-propyl alcohol, isopropyl alcohol, n-butanol, 2-butanol, isobutanol, octanol or diacetone alcohol may be used.

As the glycol derivative, ethylene glycol, propylene glycol, diethylene glycol, ethylene glycol monomethyl ether, propylene glycol monomethyl ether, ethylene glycol monoethyl ether, propylene glycol monoethyl ether, ethylene glycol n-propyl ether, propylene glycol n-propyl ether, ethylene glycol n-butyl ether, propylene glycol n-butyl ether or the like may be used.

As the ether, methyl acetate, ethyl acetate, butyl acetate, methyl acetoacetate, ethyl acetoacetate or the like may be used.

As the ketone, acetone, methyl ethyl ketone, methyl isobutyl ketone, acetyl acetone or the like may be used.

As the ether, ethyl ether, butyl ether, methyl cellosolve, ethyl cellosolve, dioxane or the like may be used.

The hydrolytic polycondensate of the Si(OR1)nR2m, the black pigment dispersed solution and the solvent as well as, if necessary, a colored pigment dispersed solution and metal salt are mixed, thereby obtaining the paint for a heat absorbing film of the present invention.

In the heat absorbing film paint composed as stated above, the weight ratio of the hydrolytic polycondensate of Si(OR1)nR2m and the black pigment (or a mixture of the black pigment, colored pigment and metal salt) is preferably "(hydrolytic polycondensate of Si(OR1)nR2m+black pigment (or mixture of black pigment, colored pigment and metal salt))/paint"=0.2 to 30 wt. % and "black pigment (or mixture of black pigment, colored pigment and metal salt)/(hydrolytic polycondensate of Si(OR1)nR2+black pigment (or mixture of black pigment, colored pigment and metal salt)"=20 to 95 wt. %. With these ratios, the resultant heat absorbing film paint can exhibit adhesion, reliability, heat absorbing property and film formation property in a well-balanced fashion.

It is noted that if too large amounts of the black pigment, the colored pigment and the metal salt are added to the heat absorbing film paint, film strength and adhesion may deteriorate and reliability may greatly deteriorate. Conversely, if the amount of the black pigment (or mixture of the black pigment, colored pigment and metal salt) is insufficient, the film may be colored insufficiently and the resultant paint may not provide satisfactory heat absorbing property.

To apply the heat absorbing film paint, a spin coating method, a spray method, a dip method, a brushing method or the like may be employed. If the paint is applied onto the conductive reflecting film on the inner surface of the color CRT, the spray method is considered preferable so as to make the thickness of an obtained film uniform.

A heat absorbing film obtained from such a heat absorbing film paint, that is, the heat absorbing film of the present invention preferably has a thickness of 20 to 2000 nm. This is because the resultant film cannot exhibit the heat absorbing effect, adhesion and reliability in a well-balanced fashion if the film thickness is less than 20 nm, and electron transmittance may be lowered and the brightness of the color CRT may be lowered if the film thickness exceeds 2000 nm.

The subjective brightness (L*value) of the heat absorbing film is preferably not more than 90. If the brightness (L*value) is not less than 90, the heat absorbing effect of the heat absorbing film can be hardly obtained.

This subjective brightness (L*value) of the heat absorbing film can be obtained by measuring the color of the film by using, for example, "Colorimeter or Chroma Meter CR-300" manufactured by Minolta Co., Ltd.

Further, this heat absorbing film is used while being formed on the color CRT as shown in, for example, FIG. 1. The color CRT 1 in which this heat absorbing film is formed, serves as the color CRT of the present invention.

Namely, the color CRT 1 has a generally ampullaceous shape as a whole and has an electron gun 3 and a color selection electrode 4 having plural lines of stripe slits provided in a valve 2 having a vacuum interior. In this example, an aperture grill type is employed for the color selection electrode 4.

The valve 2 consists of a neck portion 6 in which the electron gun 3 is disposed, a funnel portion 7 formed to project from the neck portion 6, a face portion 8 which mainly forms a screen surface and a panel portion 10 which is provided by a skirt portion 9 formed to rise from the circumference of the face portion 8.

The color selection electrode 4 is provided inside the panel portion 10. After the color selection electrode 4 is provided inside the panel portion 10, the panel portion 10 and the funnel portion 7 are welded and joined to each other and a seal portion 12 is thereby formed. Consequently, the valve 2 is assembled.

A fluorescent surface 11 is formed on the inner surface of a glass surface forming the face portion 8. This fluorescent surface 11 is configured such that red, green and blue fluorescent materials printed lengthwise in a stripe manner to thereby form fluorescent stripes and that the fluorescent stripes are regularly arranged crosswise. Carbon stripes are arranged between the fluorescent stripes, whereby the contrast ratio of the fluorescent surface 11 is improved.

In addition, to smooth an uneven surface formed by the fluorescent stripes, an organic intermediate film (not shown) is formed on the fluorescent surface 11. On this organic intermediate film, a conductive reflecting film (not shown in FIG. 1) is formed by heating and depositing aluminum as in the case of FIG. 2. On this conductive reflecting film, a heat absorbing film (not shown in FIG. 1) formed out of the above-stated heat absorbing film paint of the present invention is formed as in the case of FIG. 2.

In the color CRT 1 constituted as stated above, the heat absorbing film, which is formed out of the heat absorbing film paint, has heat resistance in a temperature range of not less than 350° C. and not more than 500° C. Therefore, even if a heat absorbing film is formed on the conductive reflecting film of the panel portion 10 prior to an assembly step, the film is not discolored in a heat treatment step in the later assembly step and can sufficiently exhibit desired function.

Moreover, if the R2 group in the compound represented by Si(OR1)nR2m has the number of carbons of 1 to 10, it has appropriate elasticity. As a result, the heat absorbing film also exhibits elasticity, thereby making it possible to prevent the film from cracking or floating from the conductive reflecting film.

Furthermore, in this color CRT 1, if the components of the organic intermediate film provided between the fluorescent surface and the conductive reflecting film are gasified as a result of a heat treatment step during the manufacture of the CRT 1, the R2 group having the number of carbons of 1 to 10 contained in the heat absorbing film functions as evaporation holes. The heat absorbing film can be, therefore, further prevented from cracking or floating from the conductive reflecting film.

Additionally, if trifunctional silicate is used as the compound represented by Si(OR1)nR2m in the heat absorbing film paint, a resultant heat absorbing film has more excellent binding property. Accordingly, the black pigment in the film does not peel off and the heat absorbing film serves as a good film sufficiently, closely bound with the conductive reflecting film made of an aluminum deposited film.

A film containing silicon dioxide may formed on the heat absorbing film and these films may be used as a stacked film. In that case, the heat absorbing film is bound with the conductive reflecting film more strongly due to the presence of the silicon dioxide containing film.

DETAILED DESCRIPTION OF THE PREFERRED EMBODIMENTS

Figure 1:
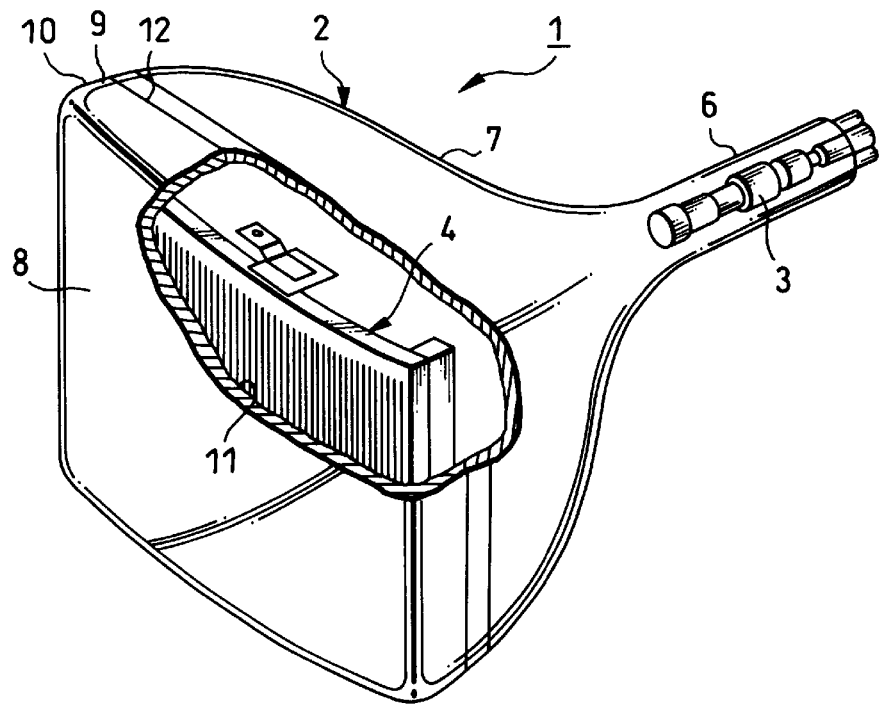
FIG. 1 is a perspective view showing the schematic configuration of a color CRT according to the present invention.
Figure 2:
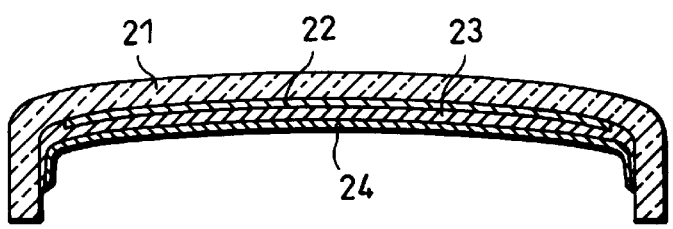
FIG. 2 is a cross-sectional view of a panel according to the present invention.

The present invention will be described in detail hereinafter.

[Formation of Paint for Heat Absorbing Film]

First, an example of a paint for a heat absorbing film according to the present invention was formed as follows. 30 g of graphite fine grains (grain diameter of 20 nm), 10.5 g of a polymeric dispersing agent, 150 g of glass beads, 259.5 g of NPA (n-propanol) were mixed. The resultant mixture was turned by 2500 times and dispersed for 4 hours by a sand mill. Thereafter, the glass beads were separated from the mixture and a uniform dispersed solution (a) of a black pigment was obtained.

Also, differently from the above, 14 g of phenyltrimethoxysilane, 69 g of ethyl alcohol, 0.4 g of 1N nitric acid and 16.6 g of pure water were mixed. The resultant mixture was matured at 60° C. for 1 hour and a uniform solution (b) was obtained.

Thereafter, 13.2 g of the above dispersed solution (a), 11.3 g of the above solution (b) and 75.5 g of ethyl alcohol were mixed and a heat absorbing film paint (A) containing the black pigment was obtained.

[Formation of Heat Absorbing Film]

Embodiment 1

Next, based on the above-stated heat absorbing film paint (A), a heat absorbing film, as Embodiment 1, was formed as follows.

Aluminum was deposited on one surface of a transparent glass substrate and an aluminum film was thereby formed. Then, the aluminum film surface was conditioned at 25° C.

Next, the above-stated heat absorbing film paint (A) was applied on this surface by a spray method and heated at a temperature of 450° C. for 30 minutes, thereby forming a heat absorbing film of 0.2 μm in thickness.

The color (L*value), infrared reflectance as heat absorbing performance, total light transmittance, film thickness, adhesiveness, crack, float of the heat absorbing film thus obtained were examined, of which results are shown in a table below.

These characteristics of the heat absorbing film were measured as shown below.

Color (L*value)

Color was measured by means of "calorimeters (CR-300)" manufactured by Minolta Co., Ltd.

Infrared reflectance

Reflectance at a wavelength of 2000 cm$^{-1}$ was measured by means of "FT-IR300E" manufactured by JASCO Corporation.

Total light transmittance

Total light transmittance was measured by means of "Haze Meter (Model Tc-H III DP) manufactured by Tokyo Denshoku Co., Ltd.

Film thickness

Film thickness was measured by means of "Dektak 3ST" manufactured by ULVAC JAPAN LTD.

Adhesiveness

"Scotch 810" manufactured by SUMITOMO 3M Limited was bonded to the heat absorbing film and peeled off at a breath, and the occurrence of a damage on a film surface was visually observed and evaluated.

Crack and float

The film which had been subjected to a heat treatment was visually observed and evaluated.

Embodiment 2

A heat absorbing film, as Embodiment 2, was formed by performing the same operation as that of Embodiment 1.

However, instead of the above-stated heat absorbing film paint (A), a heat absorbing film paint formed by mixing 15 g of a dispersed solution (a), 8.3 g of the above solution (b) and 76.7 g of n-propyl alcohol was used.

The characteristics of the heat absorbing film thus obtained were examined in the same manner as in Embodiment 1, of which results are shown in the table below.

Embodiment 3

A heat absorbing film, as Embodiment 3, was formed by performing the same operation as that of Embodiment 1.

However, instead of the above-stated heat absorbing film paint (A), a heat absorbing film paint formed by adding, as a black pigment, 10 g of Co—Fe—Cr composite oxide (grain diameter of 0.04 μm) as well as 15 g of graphite fine grains was used.

The characteristics of the heat absorbing film thus obtained were examined in the same manner as in Embodiment 1, of which results are shown in the table below.

Embodiment 4

A heat absorbing film, as Embodiment 4, was formed by performing the same operation as that of Embodiment 1.

However, instead of the above-described heat absorbing film paint (A), a heat absorbing film paint formed by adding log of Co—Fe—Cr oxide compound (grain diameter of 0.04 μm) as a black pigment and 5 g of Co—Al oxide compound (grain diameter 0.03 μm) as a blue pigment as well as 15 g of graphite fine grains was used.

The characteristics of the heat absorbing film thus obtained were examined in the same manner as in Embodiment 1, of which results are shown in the table below.

Embodiment 5

A heat absorbing film, as Embodiment 5, was formed by performing the same operation as that of Embodiment 1.

However, instead of the above-described heat absorbing film paint (A), a heat absorbing film paint formed by adding 5 g of manganese nitrate to be thermally decomposed into an oxide film as well as 20 g of graphite fine grains was used.

The characteristics of the heat absorbing film thus obtained were examined in the same manner as in Embodiment 1, which results are shown in the table below.

Embodiment 6

A heat absorbing film, as Embodiment 6, was formed by performing the same operation as that of Embodiment 1.

However, instead of the above-described heat absorbing film paint (A), a heat absorbing film paint formed by replacing the polymeric dispersion agent with butyral resin was used.

The characteristics of the heat absorbing film thus obtained were examined in the same manner as in Embodiment 1, of which results are shown in the table below.

Embodiment 7

A heat absorbing film, as Embodiment 7, was formed by performing the same operation as that of Embodiment 1.

However, instead of the above-described heat absorbing film paint (A), a heat absorbing film paint formed by replacing phenyltrimethoxysilane with methyltrimethoxysilane was used.

The characteristics of the heat absorbing film thus obtained were examined in the same manner as in Embodiment 1, of which results are shown in the table below.

Embodiment 8

A heat absorbing film, as Embodiment 8, was formed by performing the same operation as that of Embodiment 1.

However, instead of the above-described heat absorbing film paint (A), a heat absorbing film paint formed by replacing phenyltrimethoxysilane with vinyltrimethoxysilane was used.

The characteristics of the heat absorbing film thus obtained were examined in the same manner as in Embodiment 1, which results are shown in the table below.

Embodiment 9

A heat absorbing film, as Embodiment 9, was formed by performing the same operation as that of Embodiment 1.

However, instead of the above-described heat absorbing film paint (A), a heat absorbing film paint formed by replacing phenyltrimethoxysilane with γ-methacryloxypropyltrimethoxysilane was used.

The characteristics of the heat absorbing film thus obtained were examined in the same manner as in Embodiment 1, of which results are shown in the table below.

Embodiment 10

A heat absorbing film, as Embodiment 10, was formed by performing the same operation as that of Embodiment 1.

However, instead of the above-described heat absorbing film paint (A), a heat absorbing film paint formed by replacing phenyltrimethoxysilane with γ-glycidoxypropyltrimethoxysilane was used.

The characteristics of the heat absorbing film thus obtained were examined in the same manner as in Embodiment 1, of which results are shown in the table below.

Embodiment 11

A heat absorbing film, as Embodiment 11, was formed by performing the same operation as that of Embodiment 1.

However, instead of the above-described heat absorbing film paint (A), a heat absorbing film paint formed by adding 5 g of vinyltrimethoxysilane as well as 10 g of phenyltrimethoxysilane with methyltrimethoxysilane was used.

The characteristics of the heat absorbing film thus obtained were examined in the same manner as in Embodiment 1, of which results are shown in the table below.

Embodiment 12

A heat absorbing film, as Embodiment 12, was formed by performing the same operation as that of Embodiment 1.

However, instead of the above-described heat absorbing film paint (A), a heat absorbing film paint formed by replacing phenyltrimethoxysilane with 13 g of vinyltrimethoxysilane and 2 g of tetramethoxysilane was used.

The characteristics of the heat absorbing film thus obtained were examined in the same manner as in Embodiment 1, of which results are shown in the table below.

Embodiment 13

A heat absorbing film, as Embodiment 13, was formed by performing the same operation as that of Embodiment 1.

However, instead of the above-described heat absorbing film paint (A), a heat absorbing film paint formed by replacing phenyltrimethoxysilane with tetramethoxysilane was used.

The characteristics of the heat absorbing film thus obtained were examined in the same manner as in Embodiment 1, of which results are shown in the table below.

Comparison 1

A heat absorbing film, as Comparison 1, was formed by performing the same operation as that of Embodiment 1.

However, instead of the above-described heat absorbing film paint (A), a heat absorbing film paint formed by replacing graphite fine grains with carbon black having a grain diameter of 25 μm was used.

The characteristics of the heat absorbing film thus obtained were examined in the same manner as in Embodiment 1, of which results are shown in the table below.

Comparison 2

A heat absorbing film, as Comparison 2, was formed by performing the same operation as that of Embodiment 1.

However, a heat absorbing film paint formed by replacing the above solution (b) with a uniform solution (c) resulting from a mixture of 94 g of ethyl alcohol and 6 g of polyvinyl alcohol was used.

The characteristics of the heat absorbing film thus obtained were examined in the same manner as in Embodiment 1, of which results are shown in the table below.

TABLE 1

|  | film color (L*) | infrared reflectance (%) | total light transmittance (%) | film thickness (Å) | adhesiveness | crack | float |
| --- | --- | --- | --- | --- | --- | --- | --- |
| Embodiment 1 | 42.42 | 64.0 | 39.1 | 2112 | good | good | good |
| Embodiment 2 | 30.95 | 60.3 | 26.7 | 2500 | not very good | good | good |

TABLE 1-continued

|  | film color (L*) | infrared reflectance (%) | total light transmittance (%) | film thickness (Å) | adhesiveness | crack | float |
|---|---|---|---|---|---|---|---|
| Embodiment 3 | 33.80 | 56.1 | 30.9 | 2052 | good | good | good |
| Embodiment 4 | 45.15 | 69.4 | 50.2 | 1962 | good | good | good |
| Embodiment 5 | 33.99 | 58.2 | 28.6 | 2213 | good | not very good | good |
| Embodiment 6 | 33.41 | 60.7 | 29.9 | 2054 | good | good | good |
| Embodiment 7 | 33.72 | 59.6 | 29.1 | 2199 | good | good | good |
| Embodiment 8 | 43.69 | 65.2 | 43.4 | 2052 | good | good | good |
| Embodiment 9 | 33.93 | 57.4 | 29.7 | 2236 | good | good | good |
| Embodiment 10 | 38.63 | 63.9 | 40.9 | 2110 | good | good | good |
| Embodiment 11 | 33.79 | 56.7 | 30.8 | 2303 | good | good | good |
| Embodiment 12 | 45.30 | 69.1 | 50.0 | 1993 | good | good | good |
| Embodiment 13 | 37.11 | 62.3 | 40.2 | 2015 | good | not very good | good |
| Comparison 1 | 79.68 | 100.8 | 102 | 1989 | good | good | good |
| Comparison 2 | 39.56 | 64.2 | 42.9 | 855 | not good | not good | not good |

As shown in the table, Embodiments 1 to 13 could obtain essentially satisfactory results for any characteristics.

It was found, by contrast, that Comparison 1 had a high infrared reflectance and, therefore, low heat-absorbing characteristics.

It was also found that Comparison 2 had low film adhesiveness and may undergo crack and float.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A paint for a heat absorbing film provided on a conductive reflecting film formed on a fluorescent surface on an inner surface of a panel of a color CRT, comprising:
    a black pigment having a grain diameter of not less than 10 nm and not more than 2000 nm; and
    a compound represented by $Si(OR^1)_n R^2_m$, where n+m=4, n=1 to 4, m=0 to 3, each of $R^1$ and $R^2$ is one of an alkyl group, an alkenyl group and an aryl group, or a hydrolyzate of the compound,
    wherein said compound $Si(OR^1)_n R^2_m$ is able, upon being applied and dried, to become $SiO_2$ to bind said black pigment with said conductive reflecting film.

2. The paint for a heat absorbing film according to claim 1, wherein said black pigment is composed of graphite fine grains.

3. The paint for a heat absorbing film according to claim 1, wherein said black pigment contains one or not less than two elements selected from a group consisting of C, Mn, Fe, Ni, Zn, Cr, Cu and Co.

4. The paint for a heat absorbing film according to claim 1, wherein said black pigment contains at least one of a manganese compound and a chromium compound.

5. A paint for a heat absorbing film provided on a conductive reflecting film formed on a fluorescent surface on an inner surface of a panel of a color CRT, comprising:
    a black pigment; and
    a compound represented by $Si(OR^1)_n R^2_m$, where n+m=4, n=1 to 4, m=0 to 3, each of $R^1$ and $R^2$ is one of an alkyl group, an alkenyl group and an aryl group, the carbon number of $R^2$ falling within a range of 1 to 10, or a hydrolyzate of the compound,
    wherein said compound $Si(OR^1)_n R^2_m$ is able, upon being applied and dried, to become $SiO_2$ to bind said black pigment with said conductive reflecting film.

6. The paint for a heat absorbing film according to claim 5, wherein $R^2$ of the compound represented by said $Si(OR^1)_n R^2_m$ consists of one of a methyl group, a phenyl group, a vinyl group, and a γ-methacryloxypropyl group.

7. The paint for a heat absorbing film according to claim 5, wherein the compound represented by said $Si(OR^1)_n R^2_m$ has n=3 and m=1.

8. A heat absorbing film provided on a conductive reflecting film formed on a fluorescent surface on an inner surface of a panel of a color CRT, wherein:
    said heat absorbing film is formed by being coated with a paint containing a black pigment having a grain diameter of not less than 10 nm and not more than 2000 nm, and a compound represented by $Si(OR^1)_n R^2_m$, where n+m=4, n=1 to 4, m=0 to 3, each of $R^1$ and $R^2$ is one of an alkyl group, an alkenyl group and an aryl group, or a hydrolyzate of the compound,
    wherein said compound $Si(OR^1)_n R^2_m$ is able, upon being applied and dried, to become $SiO_2$ to bind said black pigment with said conductive reflecting film.

9. The heat absorbing film according to claim 8, wherein said black pigment is composed of graphite fine grains.

10. The heat absorbing film according to claim 8, wherein said black pigment contains one or not less than two elements selected from a group consisting of C, Mn, Fe, Ni, Zn, Cr, Cu and Co.

11. The heat absorbing film according to claim 8, wherein said black pigment contains at least one of a manganese compound and a chromium compound.

12. The heat absorbing film according to claim 8, wherein said heat absorbing film has a film thickness of 20 to 2000 nm and a film subjective brightness, which is an L*value, of not more than 90.

13. A heat absorbing film provided on a conductive reflecting film formed on a fluorescent surface on an inner surface of a panel of a color CRT, wherein:

said heat absorbing film is formed by being coated with a paint containing a black pigment, and a compound represented by $Si(OR^1)_n R^2_m$, where n+m=4, n=1 to 4, m=0 to 3, each of $R^1$ and $R^2$ is one of an alkyl group, an alkenyl group and an aryl group, the carbon number of $R^2$ falling within a range of 1 to 10, or a hydrolyzate of the compound, wherein said compound $Si(OR^1)_n R^2_m$ is able, upon being applied and dried, to become $SiO_2$ to bind said black pigment with said conductive reflecting film.

14. The heat absorbing film according to claim 13, wherein $R^2$ of the compound represented by said $Si(OR^1)_n R^2_m$ consists of one of a methyl group, a phenyl group, a vinyl group, and a γ-methacryloxypropyl group.

15. The heat absorbing film according to claim 13, wherein the compound represented by said $Si(OR^1)_n R^2_m$ has n=3 and m=1.

16. The heat absorbing film paint according to claim 13, wherein said heat absorbing film has a film thickness of 20 to 2000 nm and a film subjective brightness, which is an L* value, of not more than 90.

17. A color CRT having a fluorescent surface formed on an inner surface of a panel, having a conductive reflecting film deposited while the inner surface of the panel is covered with the fluorescent surface, and having a heat absorbing film provided on the conductive reflecting film, the heat absorbing film having a lower infrared reflectance than an infrared reflectance of the conductive reflecting film, wherein:

said heat absorbing film is formed by being coated with a paint containing a black pigment having a grain diameter of not less than 10 nm and not more than 2000 nm, and a compound represented by $SI(OR^1)_n R^2_m$, where n+m=4, n=1 to 4, m=0 to 3, each of $R^1$ and $R^2$ is one of an alkyl group, an alkenyl group and an aryl group, or a hydrolyzate of the compound, wherein said compound $Si(OR^1)_n R^2_m$ is able, upon being applied and dried, to become $SiO_2$ to bind said black pigment with said conductive reflecting film.

18. The color CRT according to claim 17, wherein said black pigment is composed of graphite fine grains.

19. The color CRT according to claim 17, wherein said black pigment contains one or not less than two elements selected from a group consisting of C, Mn, Fe, Ni, Zn, Cr, Cu and Co.

20. The color CRT according to claim 17, wherein said black pigment contains at least one of a manganese compound and a chromium compound.

21. The color CRT according to claim 17, wherein said heat absorbing film has a film thickness of 20 to 2000 nm and a film subjective brightness, which is an L*value, of not more than 90.

22. A color CRT having a fluorescent surface formed on an inner surface of a panel, having a conductive reflecting film deposited while the inner surface of the panel is covered with the fluorescent surface, and having a heat absorbing film provided on the conductive reflecting film, the heat absorbing film having a lower infrared reflectance than an infrared reflectance of the conductive reflecting film, wherein:

said heat absorbing film is formed by being coated with a paint containing a black pigment, and a compound represented by $Si(OR^1)_n R^2_m$, where n+m=4, n=1 to 4, m=0 to each of $R_1$ and $R^2$ is one of an alkyl group, an alkenyl group and an aryl group, the carbon number of $R^2$ falling within a range of 1 to 10, or a hydrolyzate of the compound, wherein said compound $Si(OR^1)_n R^2_m$ is able, upon being applied and dried, to become $SiO_2$ to bind said black pigment with said conductive reflecting film.

23. The color CRT according to claim 22, wherein $R^2$ of the compound represented by said $Si(OR^1)_n R^2_m$ consists of one of a methyl group, a phenyl group, a vinyl group, and a γ-methacryloxypropyl group.

24. The color CRT according to claim 22, wherein the compound represented by said $Si(OR^1)_n R^2_{m\ has\ n=}3$ and m=1.

25. The color CRT according to claim 22, wherein said heat absorbing film has a film thickness of 20 to 2000 nm and a film subjective brightness, which is an L*value, of not more than 90.

* * * * *